United States Patent [19]

Maurer

[11] 3,711,780

[45] Jan. 16, 1973

[54] NONRECIPROCAL REACTANCE AMPLIFIER ARRANGEMENT

[75] Inventor: Robert Maurer, Neureut near Karlsruhe, Germany

[73] Assignee: Licentia Patent-Verwaltungs-G.m.b.H., Frankfurt am Main, Germany

[22] Filed: Oct. 14, 1970

[21] Appl. No.: 80,655

[30] Foreign Application Priority Data

| | | |
|---|---|---|
| Oct. 16, 1969 | Germany | P 19 52 138.1 |
| Oct. 16, 1969 | Germany | P 19 52 134.7 |
| Oct. 16, 1969 | Germany | P 19 52 135.8 |
| Oct. 16, 1969 | Germany | HGM 69 40 259.1 |

[52] U.S. Cl. ....................330/4.5, 330/4.9

[51] Int. Cl. ....................H03f 7/00

[58] Field of Search ....................330/4.5

[56] References Cited

UNITED STATES PATENTS 3,237,017 2/1966 Maurer et al. ....................330/4.5

*Primary Examiner*—Robert Segal
*Assistant Examiner*—Darwin R. Hostetter
*Attorney*—Spencer & Kaye

[57] ABSTRACT

A non-reciprocal reactance amplifier arrangement comprising the cascade connection of an up-converter or mixer and a down-converter or mixer whose reactance diodes are pumped in opposite phase by a common pump generator and are coupled together by a common auxiliary or idler circuit. The amplifier arrangement is provided with a broadband decoupling in the reverse direction and a simultaneous broadband transmission is the forward direction by designing the auxiliary circuit so that its transmission or band pass characteristic exhibits a supercritical course or wave form for the lower sideband and a subcritical course for the upper sideband.

11 Claims, 11 Drawing Figures

Inventor:
Robert Maurer

BY Spencer & Kaye
ATTORNEYS.

*Inventor:*
Robert Maurer

BY Spencer & Kaye
ATTORNEYS

NONRECIPROCAL REACTANCE AMPLIFIER ARRANGEMENT

BACKGROUND OF THE INVENTION

The present invention relates to a nonreciprocal reactance amplifier arrangement which consists of the cascade connection of an up-converter or mixer and a down-converter or mixer whose reactance diodes are pumped in different phases by a common pump generator. The mixer or converter on the input side of this arrangement has an input circuit which is tuned to the signal frequency, while the mixer or converter on the output side has an output circuit which is also tuned to the signal frequency. The two reactance diodes of the mixers are coupled together via a common auxiliary or idler circuit. Such reactance amplifier arrangements are known and were disclosed, for example, in German Pats. Nos. 1,120,525 and 1,166,847 and in U. S. Pats. Nos. 3,237,017 and 3,237,115.

SUMMARY OF THE INVENTION

It is the object of the present invention to provide a reactance amplifier arrangement of the above type wherein decoupling in the reverse direction and transmission in the forward direction occurs simultaneously over as broad a band as possible.

It is a further object of the invention to provide such an amplifier arrangement so that only a minimum of circuit elements is required and a simple design is realized.

The above objects are achieved according to the present invention in that in a nonreciprocal reactance amplifier arrangement having a step-up mixer and a step-down mixer which are connected in cascade and whose reactance diodes are pumped in different phases by the output of a common pump generator, an input circuit, which is tuned to the signal frequency, for the mixer which is on the input side of the amplifier arrangement, an output circuit, which is also tuned to the signal frequency, for the mixer which is on the output side of the amplifier arrangement, and an auxiliary circuit common to both of the mixers for coupling the diodes of the respective mixers together, the auxiliary circuit is dimensioned so that its transmission, or band pass, characteristic exhibits a supercritical wave form for the lower sideband of the signal in the amplifier arrangement and a subcritical wave form for the upper sideband of the signal in the amplifier arrangement.

According to one embodiment of the invention the desired transmission characteristic for the auxiliary circuit is provided by utilizing a parallel resonant circuit for the auxiliary circuit which is connected in parallel with a series circuit consisting of a series resonant circuit tuned to the lower sideband and the pump oscillator.

The neutralization of the reactive feedback admittance of the amplifier arrangement may be realized by means of the susceptance of a two-terminal network connected between the input and the output of the amplifier arrangement as is conventional in such amplifier arrangements. According to a further feature of the invention by proper dimensioning of the circuit parameters and with reactance diodes with substantially identical electrical values, the additional normally required susceptance can be eliminated and neutralization of the reactive feedback admittance provided by utilizing the finite susceptance of the auxiliary circuit and the diode parameters.

According to a still further feature of the invention a reactance amplifier arrangement for the microwave range may be provided which exhibits no ambiguities as regards its resonant circuits up to the frequencies of the upper sidebands by constructing the resonant circuits as transmission line circuits with the input and output circuits having a length equal to one-fourth of the wave length of the upper sideband.

DESCRIPTION OF THE PREFERRED EMBODIMENTS

Figure 1:
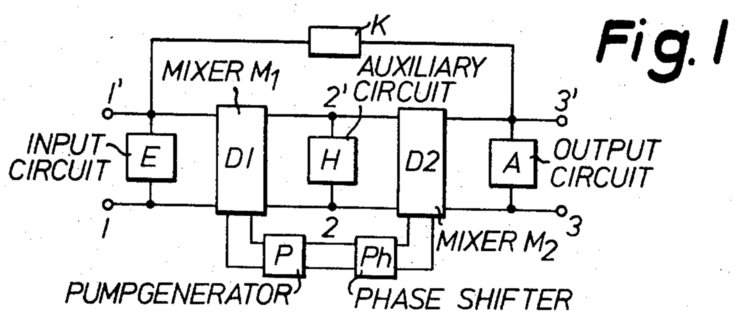
FIG. 1 is a block diagram illustrating the principals of construction of an amplifier arrangement of the type to which the present invention is directed.

Referring now to FIG. 1 there is shown the principle of the construction of a reactance type amplifier arrangement to which the present invention is directed. This arrangement comprises the cascade connection of an up-converter or step-up mixer $M_1$ and a down-converter or step-down mixer $M_2$. The reactance diode of the step-up mixer $M_1$, which is generally realized by a so-called capacitance diode, is indicated by the designation D1 in the drawing. Across the input terminals 1',1 of the amplifier arrangement, and thus in parallel with the input of mixer $M_1$, is connected an input circuit E which is tuned to the signal frequency. The output of the second mixer $M_2$, whose reactance diode is also formed by a capacitance diode marked D2, is connected to the output terminals 3',3 and in parallel with an output circuit A which is also tuned to the signal frequency. The reactance diodes D1 and D2 are controlled in different phases by the output from a pump oscillator P, at a pump frequency p. In order to indicate that the two reactance diodes D1 and D2 are pumped in different phases, a phase shifter Ph is shown in the connecting line between the pump oscillator P and the second reactance diode D2. It should be understood, however, that with suitable configuration of the circuit arrangement (as will be explained below), an opposite-phase control of the reactance diodes D1 and D2 can be effected without the use of an additional phase shifter Ph. The two reactance diodes D1 and D2 are coupled together by means of a common idler or auxiliary circuit H which is connected across the terminals 2′,2.

In such an amplifier arrangement a feedback admittance is present between the input terminals 1, 1′ and the output terminals 3,3′ of the circuit. This feedback admittance can be neutralized by the connection of a suitable additional compensation network. Such a network is indicated in FIG. 1 by the two-terminal network marked K connected between the output terminal 3′ and the input terminal 1′. With special dimensioning of the circuit arrangement according to a further feature of the invention this additional susceptance can be eliminated.

The desired broadband decoupling of the arrangement as regards its input or output, respectively, is accomplished, according to the present invention by special dimensioning or design of the effective auxiliary circuit so that its transmission characteristic exhibits a supercritical course or wave shape for the lower sideband frequency ($p-s$) and a subcritical course or wave shape for the upper sideband frequency ($p+s$), where p is the pump frequency and s the signal frequency. That is, the auxiliary circuit H is effective to provide supercritical coupling for the lower sideband and subcritical coupling for the upper sideband.

Figure 2:
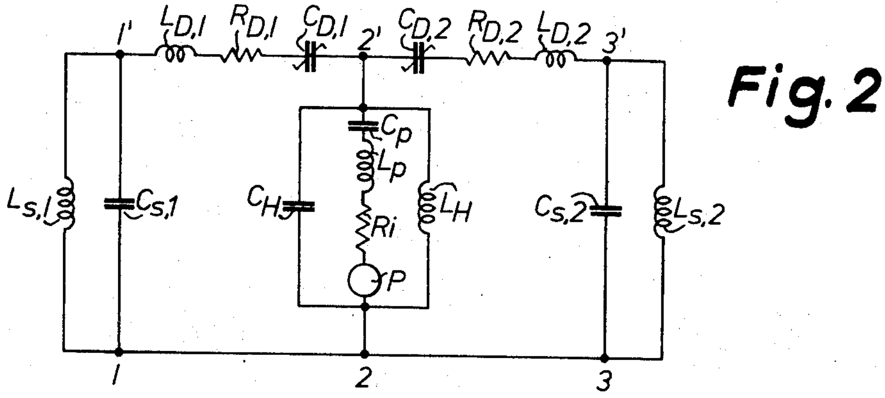
FIG. 2 is a schematic circuit diagram illustrating one embodiment of an amplifier arrangement according to the invention.

One possibility according to the invention of realizing such a resonance behavior for the auxiliary circuit H is shown in FIG. 2, which illustrates the equivalent circuit diagram of a nonreciprocal parametric amplifier with real reactance diodes at high frequencies. The input signal circuit E, corresponding to that of FIG. 1 comprises a circuit formed by the inductance $L_{s,1}$ and the capacitance $C_{s,1}$ connected in parallel. The elements of the output signal circuit A are correspondingly marked $C_{s,2}$ and $L_{s,2}$.

The reactance diode D1 is shown in the equivalent circuit diagram by a series circuit disposed between terminals 1′ and 2′ and which is composed of the inductance $L_{D,1}$, the capacitance $C_{D,1}$ and the associated diode loss resistance $R_{D,1}$. In the same manner the equivalent circuit of the other reactance diode D2 is formed by the series connection of the capacitance $C_{D,2}$, the resistor $R_{D,2}$ and the inductance $L_{D,2}$ connected between the terminals 2′ and 3′.

The auxiliary circuit H is disposed in the transverse branch of the amplifier circuit arrangement between the common junction 2′ of the two diodes D1 and D2 and the base point 2, and is formed by a parallel resonant circuit consisting of capacitance $C_H$ and inductance $L_H$. Connected in parallel with the auxiliary circuit H is a series circuit consisting of the pump oscillator P and a series resonant circuit, consisting of the pump circuit capacitance $C_p$ and the pump circuit inductance $L_p$ as well as the internal resistance Ri of the pump oscillator P, which is tuned to the lower sideband frequency. The pump voltage signal is thus fed into the amplifier arrangement in parallel with the auxiliary circuit H and in a manner known in the art provides the desired phase shifts for the pump voltage supplied to the respective diodes.

Figures 3, 4:
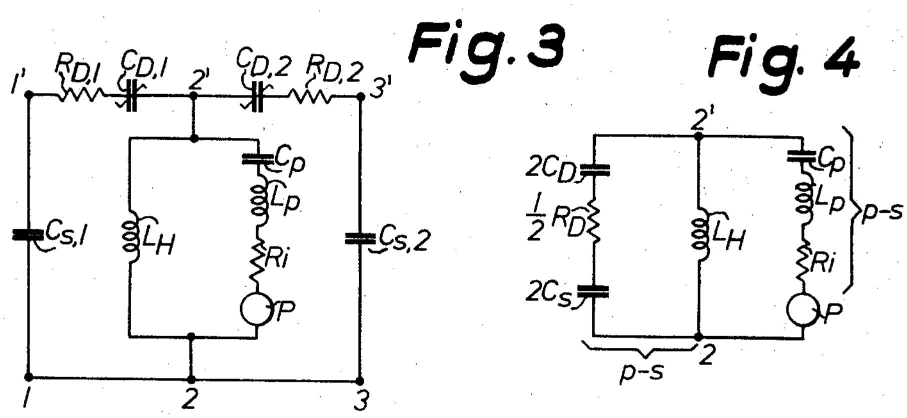
FIG. 3 is a schematic circuit diagram illustrating the effective circuit arrangement when the circuit of FIG. 2 is considered for only the lower sideband frequency.
FIG. 4 is a simplified circuit diagram of the effective circuit shown in FIG. 3.

If now the circuit of FIG. 2 is considered for the lower sideband frequency ($p-s$) only, the result is the circuit shown in FIG. 3. The input and output circuits E and A, respectively, are capacitive in this frequency range so that only the signal circuit capacitances $C_{s,1}$ and $C_{s,2}$ remain effective. The equivalent diode circuit is also capacitive at this frequency ($p-s$), and thus inductances $L_{D,1}$ and $L_{D,2}$ are not shown in FIG. 3. The auxiliary circuit H, which is provided in the form of a parallel circuit, is inductive at the above-mentioned frequency, and thus only the auxiliary circuit inductance $L_H$ is shown in FIG. 3. The circuit elements of the pump circuit, however, are fully effective. By simply redrafting the circuit of FIG. 3, the equivalent circuit shown in FIG. 4 results for the now effective auxiliary circuit which consists of the connection of a parallel resonant circuit, formed of circuit elements $2C_D$, $R_D/2$, $2C_s$, $L_H$, in parallel with a series circuit consisting of circuit elements $C_p$, $L_p$, Ri, P. The resulting parallel circuit as well as the series circuit are here tuned to the lower sideband ($p-s$). This resonant circuit configuration results in a super-critical transmission or coupling characteristic.

Figure 5:
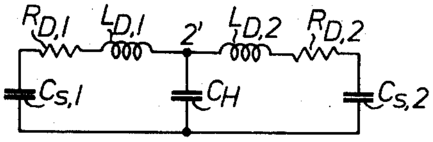
FIG. 5 is a schematic circuit diagram illustrating the effective circuit arrangement when the circuit of FIG. 2 is considered for only the upper sideband frequency.
Figure 6:
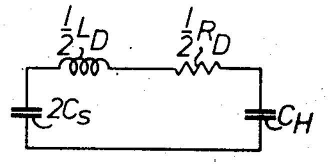
FIG. 6 is a simplified circuit diagram of the effective circuit shown in FIG. 5.

For the upper sideband ($p+s$) the circuit shown in FIG. 2 operates in the same manner as the equivalent circuit diagram shown in FIG. 5. As illustrated the only portions of the signal circuits E and A at the input and output, respectively, which remain effective are the corresponding capacitances $C_{s,1}$ and $C_{s,2}$. The equivalent circuits of the two reactance diodes D1 and D2 consist, at that frequency, only of the series connection of the corresponding ohmic resistors $R_{D,1}$, $R_{D,2}$ and the corresponding inductances $L_{D,1}$, $L_{D,2}$ respectively. The auxiliary circuit H acts capacitively at this frequency, as shown by the auxiliary circuit capacitance $C_H$. The series resonant circuit for coupling the pump oscillator P forms such a high inductance at the upper sideband frequency in question that the pump coupling is practically no longer effective for the upper sideband. Thus, if the circuit of FIG. 5 is redrafted, the circuit diagram shown in FIG. 6 will result, which results in a subcritical course of the transmission characteristic in the thus-formed effective auxiliary circuit.

According to a further feature of the present invention the capacitances of the signal circuits E and A are dimensioned according to the following conditions:

$$C_s=\frac{2G_D S^{(0)}\left(2+2\sqrt{2\,\frac{(B_{p+s}/B_{p-s})-a^2}{1+a}}\right)}{R_D(p+s)^2\left(1-\frac{s}{2p}\right)}$$

where $S^{(0)}$ is the reciprocal base capacitance of the diode;

$s$ is the signal frequency;

$p$ is the pump frequency;

$B_{p+s}$ is the band width at the upper sideband;

$B_{p-s}$ is the band width at the lower sideband;

$a$ is the ratio of the conductances at the upper and lower sidebands;

$R_D$ is the equivalent resistance of the diode;

$G_D = s/p+s\ \gamma^2/2R_D$ $\gamma$ = the modulation control parameter of the diode.

The result of capacitances $C_s$ dimensioned in the foresaid manner is a flat slope of the entire amplifier.

In addition to the desired broadband decoupling the circuit designed according to the present invention also results in a transmission characteristic for the entire amplifier which is as broadbanded as possible. This is due to the fact that the parallel resonant circuit of the auxiliary circuit H appears for the upper sideband frequency, according to the theory of parameteric amplifiers, as a series circuit with "positive elements" on the signal side both at the input and at the output. Thus it is possible to compensate for the admittance of the parallel signal circuits E and A at the input and output of the entire arrangement. Moreover, the parallel connection of a parallel resonant circuit and a series resonant circuit, of which the effective auxiliary circuit is constructed, appears, according to the above-mentioned theory for the lower sideband at the input and output, as a series connection of a series circuit and a parallel circuit with "negative elements" at the signal frequency, so that a compensation also becomes possible.

The feedback admittance present between the input and output of the arrangement of FIG. 2 may be neutralized by means of the additional susceptance. This neutralization is a result of the fact that the conductance of the auxiliary circuit H does not represent a perfect short circuit for the signal frequency. In the microwave art, however, where the individual resonant line circuits of such an arrangement are waveguide sections, it is difficult to realize the additional susceptance required for neutralization which is usually inserted between the input and the output of the arrangement as an additional two-terminal network.

In a further embodiment of the invention the desired neutralization is effected without the above-mentioned additional susceptance. This is accomplished in that the finite susceptance of the auxiliary circuit in conjunction with the parameters of the capacitance diodes are related such that they effect the neutralization of the feedback admittance of the mixer chain. This embodiment of the invention will now be explained in detail with the aid of FIG. 7 which shows the circuit diagram of such a nonreciprocal parameteric amplifier with real reactance diodes at high frequencies.

Figure 7:
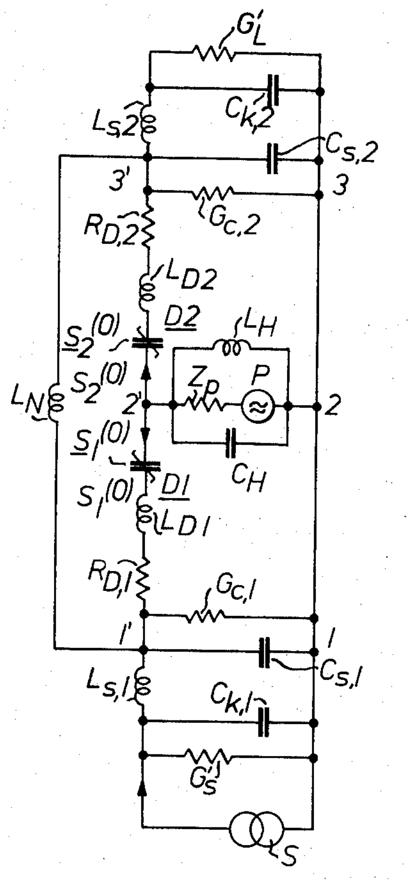
FIG. 7 is a schematic circuit diagram utilized to explain a further embodiment of an amplifier arrangement according to the invention.

As shown in FIG. 7, wherein corresponding elements are designated with the same reference numerals as in FIG. 2, the signal source is marked S and its internal conductance $G'_s$. The capacitance $C_{k,1}$ of the $\pi$ section signal input circuit is disposed in parallel with the conductance $G'_s$ at the generator output terminals. The series inductance $L_{s,1}$ of the $\pi$ section signal circuit leads to the capacitance $C_{s,1}$ connected across the external input terminals 1, 1′ of the amplifier arrangement. The loss characteristic of the $\pi$ section signal input circuit is represented by a conductance $G_{c,1}$ in parallel with the capacitance $C_{s,1}$. At the output of the amplifier arrangement, the signal circuit is similarly formed by the longitudinal inductance $L_{s,2}$ and the two transverse capacitances $C_{s,2}$ and $C_{k,2}$, which together form a $\pi$ section circuit. The loss characteristic for the output signal circuit is represented by the conductance $G_{c,2}$ connected in parallel with the signal circuit capacitance $C_{s,2}$ across the mixer output terminals 3,3′. The load characteristic is represented by the conductance $G'_L$ in parallel with capacitance $C_{k,2}$.

The two capacitance diodes D1 and D2 are disposed in the longitudinal branch of the circuit arrangement between the terminals 1′, 2′ and 2′, 3′ respectively. The capacitance diode D1 at the input side of the amplifier arrangement, in the simplified equivalent circuit diagram, is selected to be a series circuit between the terminals 1′, 2′ and has a loss resistance $R_{D,1}$ and and inductance $L_{D,1}$. $S_1^{(0)}$ indicates the reciprocal value of the base capacitance of the diode D1 while $S_1^{(1)}$ represents the first Fourier coefficient of the elastance function of capacitance diode D1. The individual elements of the capacitance diode D2 which are disposed between the terminals 2′ and 3′ in series connection are marked in an analogous manner. Connected in the transverse branch of the circuit arrangement between the terminals 2 and 2′ is the auxiliary circuit H consisting of the parallel connection of capacitance $C_H$ and inductance $L_H$. The pump generator P and its associated complex characteristic impedance $Z_p$ at the signal frequency $s$ is connected in parallel with the auxiliary circuit H so that pump coupling occurs parallel to the auxiliary circuit. In order to neutralize the annoying feedback admittance of the amplifier circuit arrangement an additional reactance is provided in the circuit illustrated in FIG. 7, which reactance is realized by an inductance $L_N$ between terminals 1′ and 3′.

Figure 8:
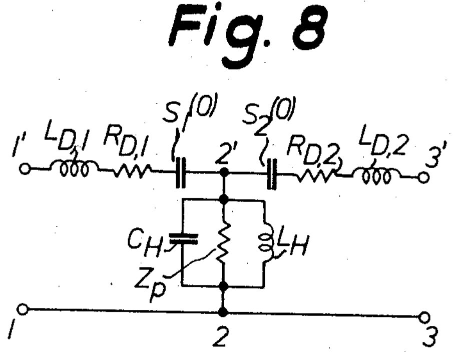
FIG. 8 is a schematic circuit diagram of a portion of the circuit of FIG. 7 utilized in explaining the operation thereof according to the invention.

The reciprocal coupling of the mixer chain at the signal frequency s is determined by the feedback admittance of the T-member which is formed at the signal frequency, by the first reactance diode D1, the conductance of the auxiliary circuit H and the second reactance diode D2. This T-member circuit is shown in FIG. 8, wherein the terminal designations correspond to those of FIG. 7. Thus, $L_{D,1}$ is the inductance, $R_{D,1}$ is the equivalent resistance, and $S_1^{(0)}$ is the reciprocal value of the base capacitance of the reactance diode D1. The elements of the equivalent circuit of FIG. 8 for the second reactance diode D2 are correspondingly designated and form a series circuit between the terminals 2′ and 3′. In the transverse branch between terminals 2 and 2′ lies the capacitance $C_H$ and the inductance $L_H$ of the auxiliary circuit which are connected in parallel with the complex characteristic impedance $Z_p$ of the pumping circuits at signal frequency $s$.

It has surprisingly been found that the finite susceptance of the auxiliary circuit H in conjunction with the parameters of the capacitance diodes as they are shown in the equivalent circuit diagram of FIG. 8 can be utilized to effect the neutralization of the feedback admittance without requiring an additional susceptance for this purpose.

If it is assumed that the two capacitance diodes exhibit identical electrical values, the pumping frequency which results in complete decoupling in the reverse direction without the need for an additional susceptance can be calculated from the following equation, taking into consideration the resonance in the upper and lower sideband of $L_H$ and $C_H$:

$$(p/s)^2=1.5+0.5\sqrt{5+16\left(1+\frac{1}{C_sS^{(0)}}\right)\left[1+\frac{(p+s)R_D}{\gamma^2S^{(0)}(1+a)}\right]}$$

In this equation $C_s$ is the capacitance of the $\pi$ section signal circuit at the external mixer terminals;

$\gamma$ is the modulation parameter of the capacitance diode;

$S^{(0)}$ is the reciprocal value of the base capacitance of the capacitance diode;

$R_D$ is the loss resistance of the capacitance diode.

Figure 9:
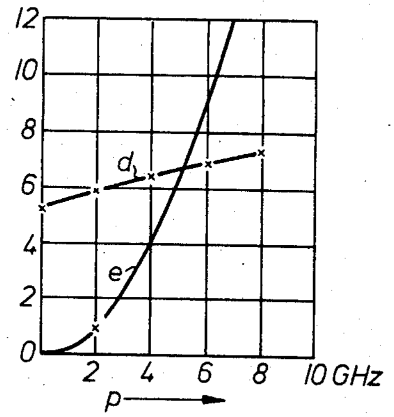
FIG. 9 is a curve utilized to explain the embodiment of the invention illustrated by FIGS. 7 and 8.

The desired pumping frequency can be determined, for example, by graphically solving this equation as shown in FIG. 9. Here d represents the plot of the right-hand portion, and e the plot of the left-hand portion of the equation. The point of intersection of these two curves *d* and *e* provides the desired pumping frequency *p*. In the example shown in FIG. 9 it was assumed that the amplifier at resonance and with input and output impedance matching has an amplification of 16 which results in the ratio a between the conductances of the upper and lower sidebands being 0.6. With this data and the assumption that $$C_sS^{(0)} = 1, \gamma = 1/4 \text{ and } S^{(0)}/2\pi R_D = 32 \text{ GHz}$$

a value for the pump frequency of 5.2 GHz results from FIG. 9 for a signal frequency of 2 GHz and with a conventional commercially available capacitance diode of the type OA 1122 which has a diode bias of −1V. The ratio of pump frequency *p* to signal frequency (*p/s*) should thus be selected to be approximately 3:1.

In a further embodiment of the present invention the reactance amplifier arrangement for the microwave range is so designed that it exhibits no ambiguities as regards its resonant circuits up to the frequencies of the upper sideband.

This is made possible in that the symmetrically constructed signal circuits E and A at the input and output of the amplifier arrangement are designed as line circuits whose lengths are one-fourth of the wavelength for the upper sideband.

This embodiment of the invention will be explained with the aid of FIGS. 10 and 11 which are plan and side longitudinal sections, respectively, of an amplifier arrangement. Both signal circuits E and A are symmetrically designed on the input and output sides, respectively, of the amplifier arrangement and are realized by coaxial line resonant circuits S1 and S2 whose length $1_s$ is equal to $\lambda_{p+s}/4$, where $\lambda_{p+s}$ is the wavelength at the upper sideband. The coupling of the signal generator to one end of the inner conductor J1 of the input line circuit S1 is accomplished by means of a concentrated capacitance in a manner well known in the art. The load for the amplifier arrangement is similarly coupled to the free or output end of the inner conductor J2 of the output line circuit S2.

The auxiliary circuit H is also designed as a resonant transmission line circuit and is realized in the illustrated embodiment by two parallelly connected symmetrically constructed resonant line circuits, whose length ($1_h$) is equal to $\lambda_h/4$, where $\lambda_h$ is the wavelength of the auxiliary oscillation. As illustrated, the two line circuits of the auxiliary circuit are coaxial to thus form a common inner conductor.

The internal ends of the inner conductors J1 and J2, which as illustrated are coaxial and positioned transverse to the common inner conductor J4, extend into the auxiliary circuit H and their ends are respectively axially extended by the capacitance or reactance diodes D1 and D2 which electrically contact the common inner conductor J4 of the auxiliary circuit H. Additionally, the ends of the two resonant line signal circuits S1 and S2 which face the auxiliary circuit H are also provided with concentrated signal circuit capacitances in a known manner.

Figures 10, 11:
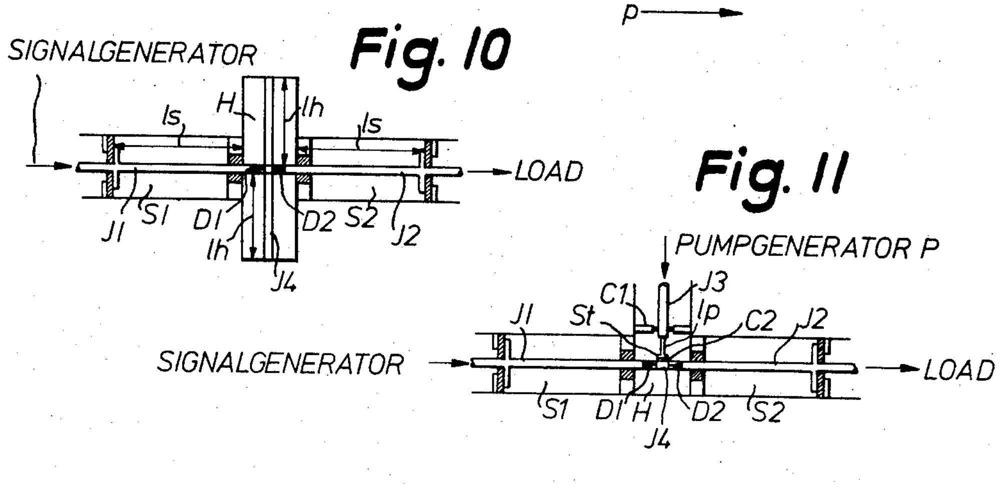
FIGS. 10 and 11 are schematic plan and side sectional views respectively of a further embodiment of the invention wherein the resonant circuits of the amplifier arrangement are formed of coaxial transmission line circuits.

The pump generator P is coupled into the circuit arrangement via a capacitively coupled coaxial line, as best shown in FIG. 11. As shown, this coaxial line is positioned transverse to both transmission line circuits of the auxiliary circuit and the transmission line circuits for the input and output circuits so that the axes of the inner conductor of all of the transmission line circuits intersect at a common point. The mounting for the inner conductor J3 of this coaxial line is simultaneously constructed in a well known manner so that it forms a transverse capacitance C1. The conductor J3 is likewise positioned so that the frontal face of its free end St forms a coupling capacitance C2 with the oppositely disposed surface of the inner conductor J4 of the auxiliary circuit H. The portion of the inner conductor J3 which extends between capacitances C1 and C2 has a length $1_p$ and is so dimensioned that it acts as an inductance at the frequencies in question. Thus a resonant circuit is provided which is formed of capacitances C1, C2 and the conductor portion with the length $1_p$, and which serves to couple the output of the pump generator P into the amplifier arrangement. The elements of the thus formed resonant circuit are dimensioned so that the coupling produces a transmission characteristic for the auxiliary circuit which has a supercritical course or coupling behavior for the lower sideband frequency. By simultaneously designing the auxiliary circuit H so that it has a subcritical course or coupling behavior for the upper sideband frequency, an amplifier arrangement is obtained in which the coupling between input and output has the optimum width and wherein moreover the entire amplifier arrangement is broadbanded.

The arrangement according to the present invention permits construction of a nonreciprocal reactance amplifier in the microwave range which exhibits no ambiguities up to the upper sideband frequency and which, moreover, permits very simple mechanical production and thus easy matching. Moreover, no additional susceptance need be provided to neutralize the feedback admittance. It is also possible to microminiaturize this amplifier arrangement.

It will be understood that the above description of the present invention is susceptible to various modifications, changes and adaptations, and the same are intended to be comprehended within the meaning and range of equivalents of the appended claims.

I claim:

1. In a nonreciprocal reactance amplifier arrangement comprising in combination: a step-up mixer and a step-down mixer connected in a cascade arrangement, each of said mixers including a reactance diode, a common pump generator for supplying out of phase pump voltage signals to said mixers to pump the respective reactance diodes in different phases, an input circuit tuned to the frequency of the input signal connected to the input terminals of said cascade arrangement, an output circuit tuned to the frequency of the input signal connected to the output of said cascade arrangement, and a resonant auxiliary circuit common to both of said mixers for coupling said reactance diodes together; the improvement wherein the effective auxiliary circuit has a transmission characteristic which exhibits a supercritical behavior for the lower sideband frequency $(p-s)$ and a subcritical behavior for the upper sideband frequency $(p+s)$, where $p$ equals the pump signal frequency and $s$ equals the input signal frequency, whereby said amplifier arrangement exhibits broadband decoupling in the reverse direction with simultaneous broadband transmissions in the forward direction.

2. The reactance amplifier arrangement as defined in claim 1 wherein said auxiliary circuit comprises a parallel resonant circuit connected in parallel with said mixers between the common junctions thereof, and wherein said auxiliary circuit is connected in parallel with a series circuit comprising said pump oscillator and a series resonant circuit tuned to the lower sideband frequency.

3. The reactance amplifier arrangement as defined in claim 1 wherein the two reactance diodes are substantially identical; wherein each of said signal input and output circuits includes a capacitance ($C_s$) connected across the input and output terminals, respectively, of said cascade arrangement and wherein said capacitances satisfy the following equation:

$$C_s=\frac{2G_D S^{(O)}\left(2+2\sqrt{2\,\frac{(B_{p+s}/B_{p-s})-a^2}{1+a}}\right)}{R_D(p+s)^2\left(1-\frac{s}{2p}\right)}$$

where $S^{(0)}$ is the reciprocal base capacitance of the diode;

$B_{p+s}$ is the bandwidth of the upper sideband;

$B_{p-s}$ is the bandwidth of the lower sideband;

$a$ is the ratio of the conductances at the upper and the lower sidebands;

$R_D$ is the loss resistance of the diode $G_D=s/p+s\,\gamma^2/2R_D$ $\gamma$ = control parameter of the diode.

4. The reactance amplifier arrangement as defined in claim 1 including a passive reciprocal two-terminal network connected between the input and output of said cascade arrangement for neutralizing the reactive admittance of said amplifier arrangement.

5. The reactance amplifier arrangement as defined in claim 2 wherein the parameters of the amplifier arrangement are dimensioned such that the neutralization of the reactive admittance thereof is effected by the finite susceptance of the said auxiliary circuit in conjunction with the parameters of the said reactance diodes.

6. The reactance amplifier arrangement as defined in claim 5 wherein the said reactance diodes are substantially identical, and wherein the following relationship exists between the frequencies of the pump signal and the input signal:

$$(p/s)^2=1.5+0.5\sqrt{5+16\left(1+\frac{1}{C_s S^{(0)}}\right)\left[1+\frac{(p+s)R_D}{\gamma^2 S^{(0)}(1+a)}\right]}$$

where $C_s$ is the capitance of the said tuned circuit across the terminals of said cascade arrangement;

$\gamma$ is the control parameter of the reactance diodes;

$S^{(0)}$ is the reciprocal value of the base capacitance of the reactance diode;

$R_D$ is the loss resistance of the reactance diode.

7. The reactance amplifier arrangement as defined in claim 5 wherein said input and output circuits comprise symmetrically constructed resonant transmission line circuits whose length ($1_s$) is equal to $\lambda_{p+s}/4$, where $\lambda_{p+s}$ is the wavelength for the upper sideband frequency.

8. The reactance amplifier arrangement as defined in claim 7 wherein said auxiliary circuit consists of two symmetrically constructed resonant transmission line circuits connected in parallel each of whose length ($1_h$) is equal to $\lambda_h/4$, where $\lambda_h$ is the wavelength of the auxiliary circuit oscillation frequency.

9. The reactance amplifier arrangement as defined in claim 8 wherein said two transmission line circuits forming said auxiliary circuit are coaxial and have a common inner conductor; wherein one end of each of the inner conductors of the resonant transmission line circuits forming said input and output circuits extends into said auxiliary circuit and is axially extended by the respective reactance diode of the associated mixer each said reactance diodes being in electrical contact with said common inner conductor of said auxiliary circuit.

10. The reactance amplifier arrangement as defined in claim 9 wherein said pump generator is coupled to said diodes via a coaxial line which extends into said auxiliary circuit and whose end is designed to form a resonant circuit which comprises a first transverse capacitance formed by a transverse mounting means for the inner conductor of said coaxial line, a second capacitance formed between the frontal face of the end of the inner conductor extending into said auxiliary circuit and the oppositely disposed surface of said inner conductor of said auxiliary circuit, and an inductance formed by the portion of the inner conductor between said mounting and said frontal face.

11. The reactance amplifier arrangement as defined in claim 10 wherein the inner conductor of the transmission line circuits forming said input and output circuits are coaxial and are positioned transverse to said inner conductor of said auxiliary circuit, and wherein said inner conductor of said coaxial line is positioned transverse to both the inner conductor of said auxiliary circuit and the inner conductors of said input and output circuits so that the axes of all of said inner conductors intersect in a common point.

* * * * *